US012725307B2

(12) United States Patent
Huang et al.

(10) Patent No.: US 12,725,307 B2
(45) Date of Patent: Sep. 1, 2026

(54) IMAGE PROCESSING METHOD, SYSTEM, AND NON-TRANSITORY COMPUTER READABLE STORAGE MEDIUM

(71) Applicant: Realtek Semiconductor Corporation, Hsinchu (TW)

(72) Inventors: Yi-Hsuan Huang, Hsinchu (TW); Yao-Jia Kuo, Hsinchu (TW); Yu-Chi Tsai, Hsinchu (TW); Wen-Tsung Huang, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 589 days.

(21) Appl. No.: 18/331,166

(22) Filed: Jun. 7, 2023

(65) Prior Publication Data

US 2024/0161343 A1 May 16, 2024

(30) Foreign Application Priority Data

Nov. 15, 2022 (TW) ................................. 111143640

(51) Int. Cl.

| | |
|---|---|
| ***G06T 7/80*** | (2017.01) |
| ***G06T 5/50*** | (2006.01) |
| ***G06T 5/73*** | (2024.01) |
| ***G06T 5/80*** | (2024.01) |
| ***G06T 7/11*** | (2017.01) |
| ***G06T 7/13*** | (2017.01) |

(52) U.S. Cl.

CPC .................. *G06T 7/80* (2017.01); *G06T 5/50* (2013.01); *G06T 5/73* (2024.01); *G06T 5/80* (2024.01); *G06T 7/11* (2017.01); *G06T 7/13* (2017.01); *G06T 2207/10016* (2013.01); *G06T 2207/10024* (2013.01); *G06T 2207/20132* (2013.01)

(58) Field of Classification Search

CPC .... G06T 7/80; G06T 5/50; G06T 5/73; G06T 5/80; G06T 7/11; G06T 7/13; G06T 2207/10016; G06T 2207/10024; G06T 2207/20132; G06T 5/70; H04N 23/81

See application file for complete search history.

(56) References Cited

U.S. PATENT DOCUMENTS

| | | | |
|---|---|---|---|
| 8,224,023 | B2 | 7/2012 | Greig |
| 8,237,771 | B2 | 8/2012 | Kurtz et al. |
| 8,773,499 | B2 | 7/2014 | Watson et al. |

(Continued)

FOREIGN PATENT DOCUMENTS

| | | | |
|---|---|---|---|
| CN | 101438590 A | 5/2009 | |
| CN | 111798459 A * | 10/2020 | ....... G06F 18/23213 |

(Continued)

*Primary Examiner* — Mekonen T Bekele

(74) *Attorney, Agent, or Firm* — CKC & Partners Co., LLC

(57) ABSTRACT

An image processing method includes following operations: receiving, by a processor, an input image from a camera; performing, by the processor, a top-view calibration process to generate a top-view calibrated image according to the input image; performing, by the processor, an object extraction process on the top-view calibrated image to generate at least one target object frame; performing, by the processer, a centering process on the at least one target object frame to generate a centered image; and outputting, by the processor, the centered image for a display panel to display.

20 Claims, 5 Drawing Sheets

(56) References Cited

U.S. PATENT DOCUMENTS

2004/0061777 A1* 4/2004 Sadok .................. G08B 17/125
348/83
2005/0226502 A1* 10/2005 Cohen .................... H04N 5/262
382/173
2007/0285534 A1* 12/2007 Makioka ................... G06T 3/40
348/240.99
2016/0267690 A1* 9/2016 Bai ....................... G06T 11/001

FOREIGN PATENT DOCUMENTS

JP 2003199097 A * 7/2003
JP WO2020090985 A1 * 10/2021 .............. E02F 9/264
WO 2015095743 A1 6/2015

* cited by examiner

C
LMO
340
MO
330

IMAGE PROCESSING METHOD, SYSTEM, AND NON-TRANSITORY COMPUTER READABLE STORAGE MEDIUM

RELATED APPLICATIONS

This application claims priority to Taiwanese Application Serial Number 111143640, filed Nov. 15, 2022, which is herein incorporated by reference.

BACKGROUND

Technical Field

The present disclosure relates to image technology. More particularly, the present disclosure relates to an image processing method, an image processing system, and a non-transitory computer readable storage medium capable of performing the top-view calibration process and centering the target object.

Description of Related Art

With development of technology, various electronic devices equipped with cameras are developed. For example, laptop computers, desktop computers, tablet computers, smart cell phones, wearable electronic devices, and automotive devices can be equipped with cameras. Users can utilize the cameras in these devices to capture dynamic images or static images and send these images to other electronic devices instantaneously to interact or communicate with other users.

SUMMARY

Some aspects of the present disclosure are to provide an image processing method. The image processing method includes following operations: receiving, by a processor, an input image from a camera; performing, by the processor, a top-view calibration process to generate a top-view calibrated image according to the input image; performing, by the processor, an object extraction process on the top-view calibrated image to generate at least one target object frame; performing, by the processer, a centering process on the at least one target object frame to generate a centered image; and outputting, by the processor, the centered image for a display panel to display.

Some aspects of the present disclosure are to provide an image processing system. The image processing system includes a camera, a memory, and a processor. The camera is configured to capture an input image. The memory is configured to store a program including a plurality of instructions. The processor is configured to execute the instructions to perform following operations: receiving the input image from the camera; performing a top-view calibration process to generate a top-view calibrated image according to the input image; performing an object extraction process on the top-view calibrated image to generate at least one target object frame; performing a centering process on the at least one target object frame to generate a centered image; and outputting the centered image for a display panel to display.

Some aspects of the present disclosure are to provide a non-transitory computer readable storage medium storing a program including a plurality of instructions. When a processor executes the instructions, the processor performs following operations: receiving an input image from a camera; performing a top-view calibration process to generate a top-view calibrated image according to the input image; performing an object extraction process on the top-view calibrated image to generate at least one target object frame; performing a centering process on the at least one target object frame to generate a centered image; and outputting the centered image for a display panel to display.

As described above, the image processing method and the image processing system in the present disclosure can perform the top-view calibration process on the image and center the target object in the image to achieve the effect of tracking the target object.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, “connected” or “coupled” may refer to “electrically connected” or “electrically coupled.” “Connected” or “coupled” may also refer to operations or actions between two or more elements.

Figure 1:
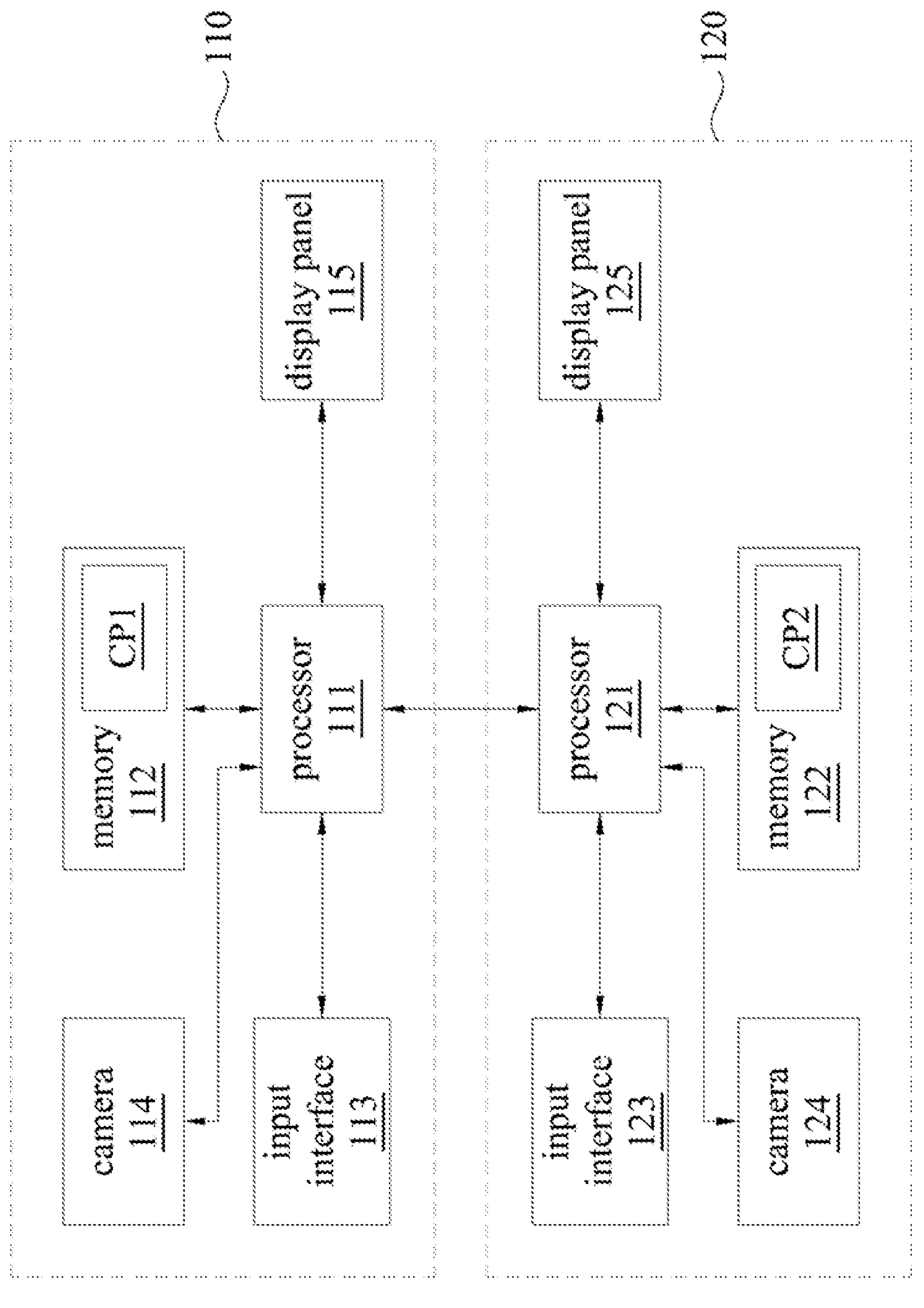
FIG. 1 is a schematic diagram of an image processing system according to some embodiments of the present disclosure.

Reference is made to FIG. 1. FIG. 1 is a schematic diagram of an image processing system 100 according to some embodiments of the present disclosure.

As illustrated in FIG. 1, the image processing system 100 includes a transmitter device 110 and a receiver device 120. In some embodiments, the transmitter device 110 or the receiver device 120 can be a laptop computer, a desktop computer, a tablet computer, a smart cell phone, a wearable electronic device, an automotive electronic device, or other electronic devices with similar functions.

As illustrated in FIG. 1, the transmitter device 110 includes a processor 111, a memory 112, an input interface 113, a camera 114, and a display panel 115. The processor 111 is coupled to the memory 112, the input interface 113, the camera 114, and the display panel 115 respectively.

In some embodiments, the processor 111 can be a central processor, a microprocessor, or other circuits with similar functions.

In some embodiments, the memory 112 can be implemented by a non-transitory computer readable storage medium. The non-transitory computer readable storage medium is, for example, a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this disclosure pertains. The memory 112 can store a program CP1 including a plurality of instructions. For example, the program CP1 includes the instructions for performing a video conference and an image processing method (for example, an image processing method 200 in FIG. 2).

In some embodiments, the input interface 113 can be a mouse, a keyboard, a touch pad, or a touch panel connected to the transmitter device 110 through wires or paired with the transmitter device 110 wirelessly.

In some embodiments, the camera 114 can be an embedded camera in the transmitter device 110 (for example, a camera embedded in a smart cell phone). In some embodiments, the camera 114 can be an external camera connected to the transmitter device 110 through wires or paired with the transmitter device 110 wirelessly (for example, a web camera connected to a desktop computer through wires).

In some embodiments, the display panel 115 can be a display panel in the transmitter device 110. In some embodiments, the display panel 115 can be integrated with the input interface 113 into a single component to form a touch display panel in the transmitter device 110.

Similarly, the receiver device 120 includes a processor 121, a memory 122, an input interface 123, a camera 124, and a display panel 125.

The implementations, coupling relationships, and functions of the processor 121, the memory 122, the input interface 123, the camera 124, and the display panel 125 are similar to the implementations, coupling relationships, and functions of the processor 111, the memory 112, the input interface 113, the camera 114, and the display panel 115 respectively, so they are not described herein again. The memory 222 can store a program CP2 including a plurality of instructions. For example, the program CP2 includes the instructions for performing a video conference.

In practical applications, the transmitter device 110 and the receiver device 120 can be coupled to each other through a network to transmit various data. For example, one user (presenter) can operate the transmitter device 110 and another user (participant) can operate the receiver device 120 to participate in a video conference through the network and a video conference server so as to transmit image data, audio data, or various other data.

The quantity of the devices in the image processing system 100 is merely for illustration, and other suitable quantities are within the contemplated scopes of the present disclosure. For example, the image processing system 100 can include three or more than three devices to join the video conference.

Figure 2:
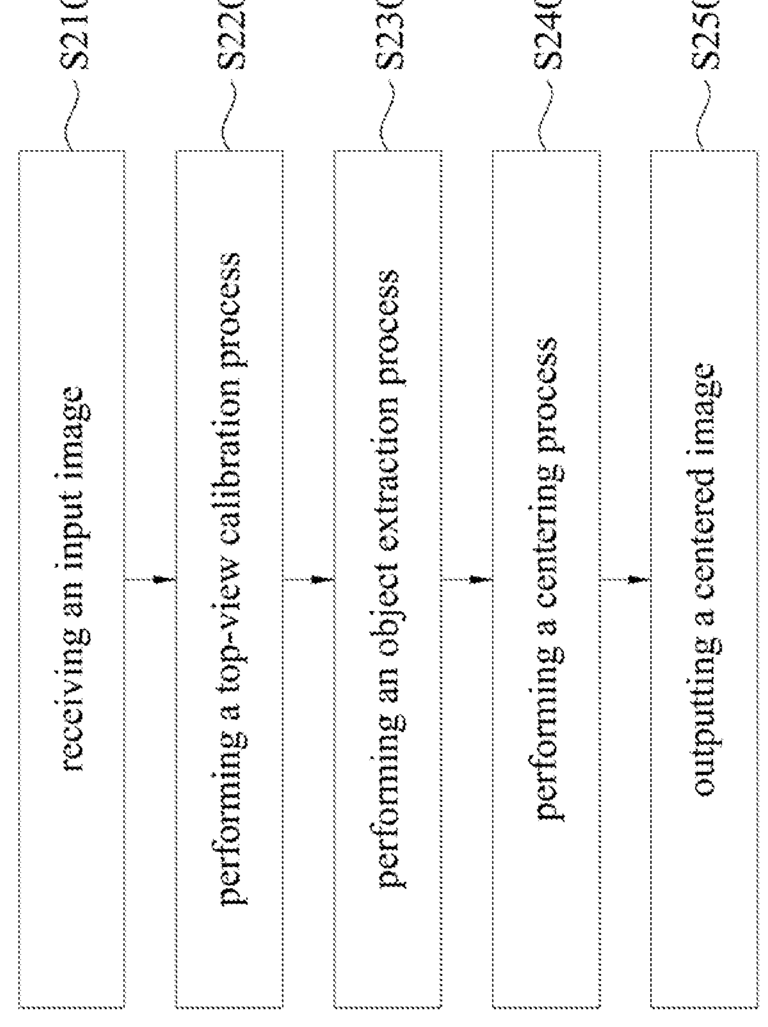
FIG. 2 is a flow diagram of an image processing method according to some embodiments of the present disclosure.

Reference is made to FIG. 2. FIG. 2 is a flow diagram of the image processing method 200 according to some embodiments of the present disclosure. The image processing method 200 includes operation S210, operation S220, operation S230, operation S240, and operation S250.

In some embodiments, the image processing method 200 can be implemented to the image processing system 100 in FIG. 1. In other words, the processor 111 can execute the program CP1 to perform the image processing method 200.

Figure 3:
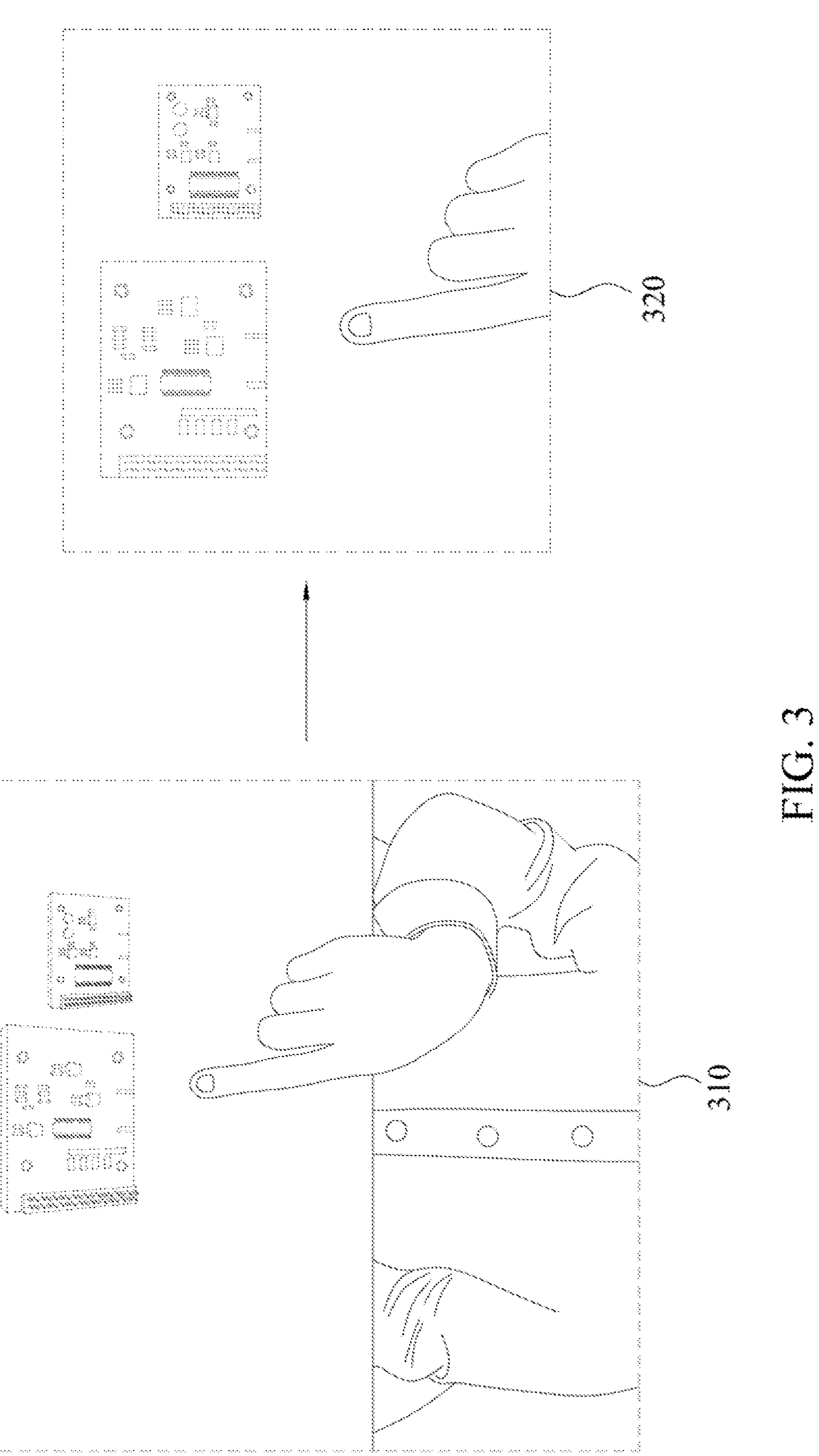
FIG. 3 is a schematic diagram of a top-view calibration process according to some embodiments of the present disclosure.
Figure 4:
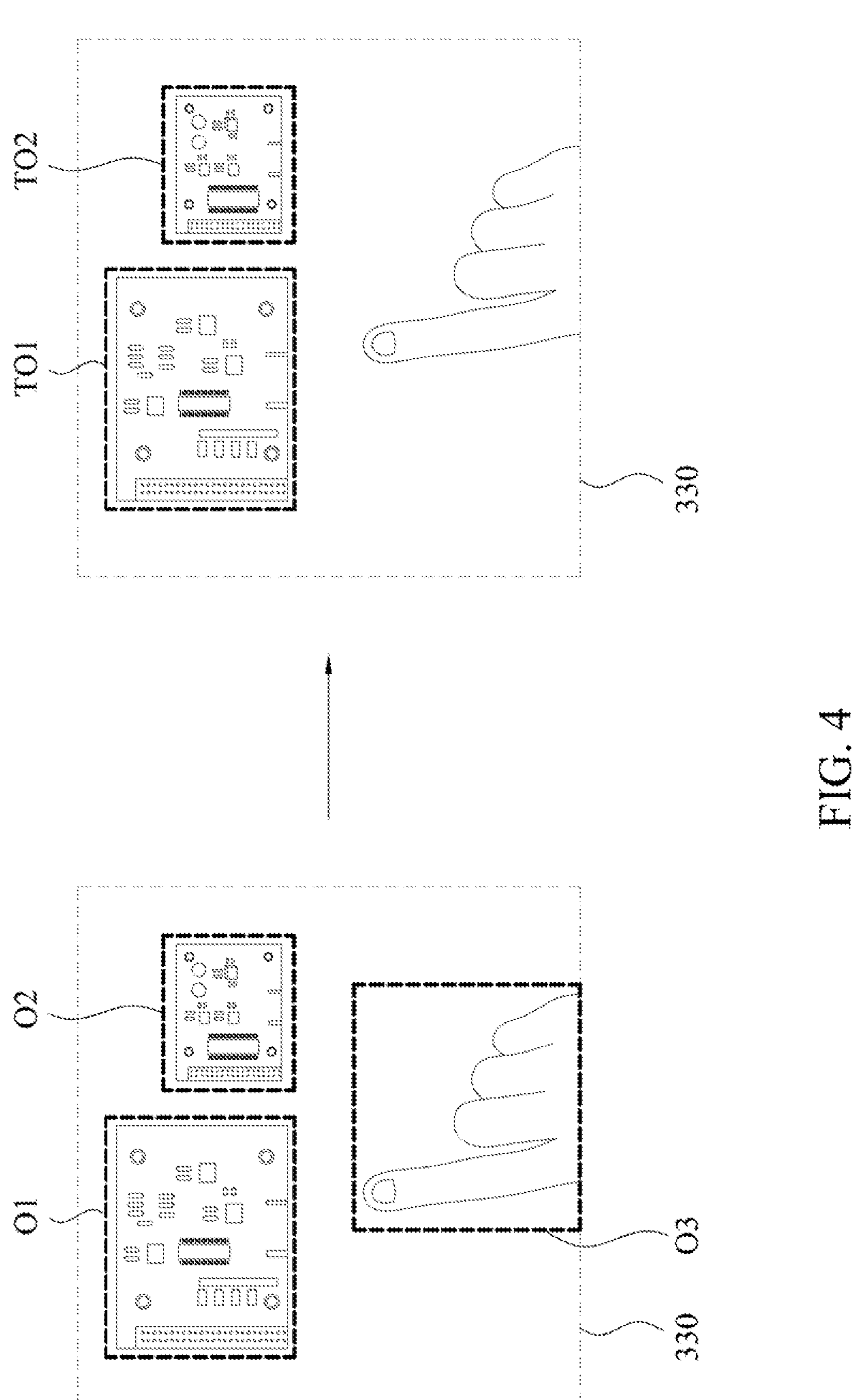
FIG. 4 is a schematic diagram of an object extraction process according to some embodiments of the present disclosure.
Figure 5:
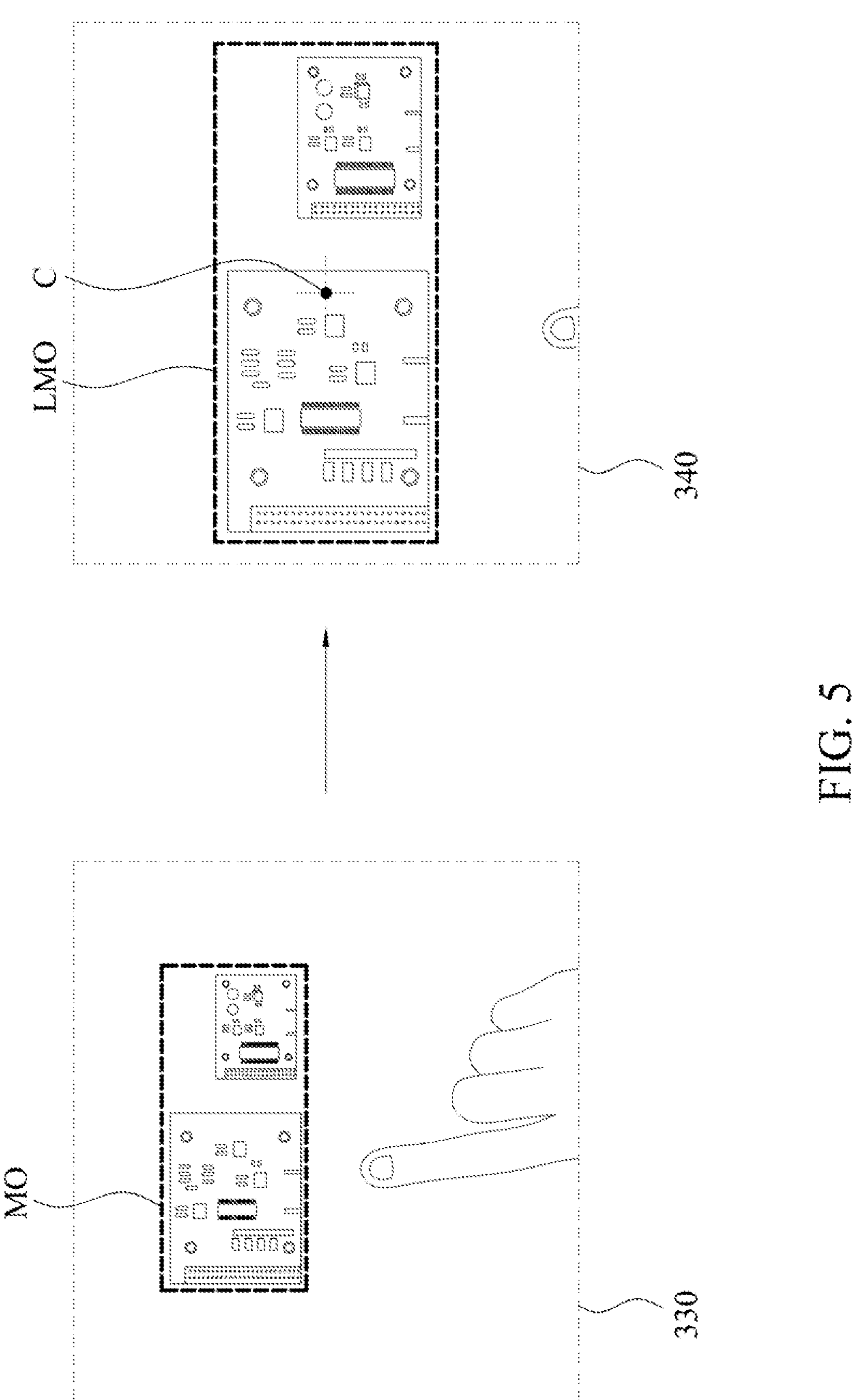
FIG. 5 is a schematic diagram of a centering process according to some embodiments of the present disclosure.

For better understanding, the image processing method 200 is described in following paragraphs with reference to FIG. 3 to FIG. 5 and the image processing system 100 in FIG. 1. FIG. 3 is a schematic diagram of a top-view calibration process according to some embodiments of the present disclosure. FIG. 4 is a schematic diagram of an object extraction process according to some embodiments of the present disclosure. FIG. 5 is a schematic diagram of a centering process according to some embodiments of the present disclosure.

References are made to FIG. 2 and FIG. 3. In operation S210, the processor 111 receives an input image 310 from the camera 114. The input image 310 can be a dynamic image or a static image.

For example, when the presenter operates the transmitter device 110 to conduct the video conference, the presenter can use the camera 114 to capture a desk surface to explain an object (for example, a chip) on the desk surface. However, in most cases, the camera 114 is not with a directly-above viewing angle to capture the desk surface. In other words, in most cases, the angle between the optical axis of the lens in the camera 114 and the horizontal plane (desk surface) is not a right angle.

It should be noted that the present disclosure is not limited to the chip and the desk surface. Various other suitable foreground objects and background environments are within the contemplated scopes of the present disclosure. In practical applications, when the background environment is flatter and more monotonous in color, the effect of subsequent image processing is better.

As described above, in most cases, the camera 114 is not with a directly-above viewing angle to capture the desk surface.

In operation S220, the processor 111 performs a top-view calibration process to generate a top-view calibrated image 320 according to the input image 310.

Generally speaking, due to characteristics of the lens of the camera 114, the input image 310 may be distorted. The distortion is, for example, the barrel distortion, the pincushion distortion, or other various distortions. For example, if the lens of the camera 114 is a wide-angle lens, the input image 310 may have a wide-angle distortion due to the short focal length of the wide-angle lens. The wide-angle distortion distorts the image more severely during the top-view calibration process. Accordingly, in these embodiments, the processor 111 performs a distortion calibration process on the input image 310 to generate a distortion calibrated image before the top-view calibration process. Then, the processor 111 performs the top-view calibration process on the distortion calibrated image to generate the top-view calibrated image 320.

Regarding the distortion calibration process, the user or the processor 111 can control the camera 114 to capture black and white checkerboard images (which can be defined as a world coordinate) from different viewing angles to acquire coordinates of corner points of the checkerboard in the images. The coordinates of the corner points in the images can be stored in the memory 112. Then, the processor 111 can assume unknown internal parameters, unknown distortion parameters and unknown camera external parameters (for example, coordinate positions and rotation angles relative to the checkboard) respectively according to characteristics of the camera and the characteristics of the lens. Then, the processor 111 can solve a matrix formed by the aforementioned unknown external parameters, the aforementioned unknown internal parameters, and the aforementioned unknown distortion parameters according to the known relationship between world coordinates of the checkerboard and the corner points of the checkerboard in the image to obtain calibration parameters for the distortion calibration process. Then, the processor 111 can use these calibration parameters to perform the distortion calibration on the input image 310 to improve the distortion problem of the input image 310.

Then, regarding the top-view calibration process, the processor 111 can calculate translation parameters or rotation parameters according to external parameters of the real camera 114 and external parameters of a virtual camera (with the directly-above viewing angle). The translation parameters or the rotation parameters can be stored in the memory 112 and can be used to calibrate an original image to be a new image with the directly-above viewing angle, as the top-view calibrated image 320 in FIG. 3. As described above, when the background environment is flatter, the effect of top-view calibration is better.

However, after the distortion calibration process and the top-view calibration process, some objects are out of the range of the calibrated image. As illustrated in FIG. 3, the input image 310 includes the presenter's clothes and presenter's entire right hand, but the range of the top-view calibrated image 320 does not include the presenter's clothes and include only part of the presenter's right hand.

References are made to FIG. 2 and FIG. 4. In operation S230, the processor 111 performs the object extraction process on the top-view calibrated image 320 to generate at least one target object frame (FIG. 4 takes two target object frames TO1-TO2 as an example, but the present disclosure is not limited thereto).

At first, the processor 111 performs a filtering process on the top-view calibrated image 320 to filter noise and generate a filtered image. The filtering process can be, for example, the Gaussian filtering process, the Mean filtering process, the Bilateral filtering process, or other filtering processes, in which the Bilateral filtering process can achieve filter noise and enhance object boundaries at the same time. Then, the processor 111 performs a sharpen process on the filtered image to generate a processed image 330. Compared to the top-view calibrated image 320 in FIG. 3, edges of the processed image 330 in FIG. 4 are clearer. Various suitable sharpen processes are within the contemplated scopes of the present disclosure.

Then, the processor 111 performs a color segmentation process on the processed image 330. For example, the processor 111 classifies colors in each pixel in the processed image 330 by using KMeans algorithm to separate the foreground objects and the background environment. As described above, when the background environment is more monotonous in color, the effect of separating the foreground objects and the background environment is better. Then, the processor 111 performs an edge detection process on the foreground objects to determine the outline of each foreground object. After the outline of each foreground object is determined, the processor 111 can determine and locate object frames O1-O3.

Although FIG. 4 illustrates three object frames O1-O3, but the present disclosure is not limited thereto. Various suitable quantities are within the contemplated scopes of the present disclosure. In addition, the present disclosure is not limited to the KMeans algorithm, and various suitable algorithms for separating the foreground objects and the background environment are within the contemplated scopes of the present disclosure.

Then, the processor 111 performs an object detection process on the object frames O1-O3 to determine types of the objects in the object frames O1-O3. As illustrated in FIG. 4, the object in the object frame O1 and the object in the object frame O2 are chips, and the object in the object frame O3 is a hand.

Then, the processor 111 performs an object exclusion process to determine the target object frame from the object frames O1-O3.

In some embodiments, the processor 111 can set which objects are common objects (for example, a hand or a mouse). The processor 111 can list theses common objects as objects to be excluded. As illustrated in FIG. 4, the processor 111 excludes the object frame O3 (the hand) and selects the remaining object frames O1-O2 as the target object frames TO1-TO2. Although the objects in the target object frames TO1-TO2 in FIG. 4 are chips, but the present disclosure is not limited thereto. For example, in other embodiments, the object in the target object frame TO1 can be a chip, and the object in the target object frame TO2 can be an instruction optical disc. In other words, the objects in the target object frames TO1-TO2 can belong to the same type or belong to different types.

In some embodiments, the user can use the input interface 113 to set the types of the target objects in advance. The processor 111 can establish a target object list to be tracked according to the types of the set target objects. The target object list can record one target object type or multiple target object types. For example, the user can set "chip" as the target object type to generate the target object list. Then, the processor 111 selects the object frames O1-O2 including this type (chip) to be the target object frames TO1-TO2, and excludes the remaining object frame O3. In other embodiments, the target object list can include different target object types. These different target object types can belong to one topic to achieve the topic tracking. For example, the target object list includes "chip" and "instruction optical disc." Thus, the object frames including chips and instruction optical discs are selected as the target object frames.

References are made to FIG. 2 and FIG. 5. In operation S240, the processor 111 performs a centering process on the target object frames TO1-TO2 to generate a centered image 340. At first, the processor 111 determines an integrated target object frame MO according to the target object frames TO1-TO2. In other words, the integrated target object frame MO can cover all of the target object frames TO1-TO2. Then, the processor 111 crops the processed image 330 according to the integrated target object frame MO to enlarge and center the integrated target object frame MO so as to generate the centered image 340. In some embodiments, a center point C of the enlarged integrated target object frame LMO is aligned with a center point C of the centered image 340. In some embodiments, an aspect ratio of the enlarged integrated target object frame LMO is equal to an aspect ratio of the integrated target object frame MO.

In some embodiments, the presenter can set distances from the enlarged integrated target object frame LMO to the upper edge, the lower edge, the left edge, and the right edge of the centered image 340 to achieve the desired display effect. In some embodiments, the presenter can also set the adjustment speed and the adjustment time through the input interface 113 to achieve the desired display effect.

In operation S250, the processor 111 outputs the centered image 340 for the display panel 115 to display. In some embodiments, the processor 111 outputs the centered image 340 (for example, through the video conference server) to the processor 121 in the receiver device 120 for the display panel 125 to display. Thus, the participant can view the centered image 340 through the display panel 125. Since the centered image 340 has been calibrated to be with the directly-above viewing angle and the target object is enlarged and centered, the participant can focus on that target object in the centered image 340 and listen to the presenter's explanation for this target object at the same time. Accordingly, the video conference is more efficient.

Some related approaches need multiple cameras to achieve the effect of tracking the target objects. Some related approaches merely track one single target object or track one single target object in different images.

Compared to the related approaches above, the present disclosure only needs a single camera 114 to achieve the effect of top-view calibration and tracking the target objects. In addition, the present disclosure can track multiple target objects in one image.

In some embodiments, the input image 310 is a dynamic image. In other words, the input image 310 includes a plurality of image frames. In practical applications, the presenter may change the position of the target object during the presentation, change the shape of the target object during the presentation, move the target object out of the capture range of the camera 114 during the presentation, or move a new target object into the capture range of the camera 114 during the presentation. When the presenter performs the aforementioned operations, the position or the range of the integrated target object frame MO in the next image frame may be different from the position or the range of the integrated target object frame MO in the current image frame. The processor 111 calculates the displacement amount or the range change amount according to the positions or the capture ranges of the integrated target object frame MO in the two image frames (the current image frame and the next image frame), and uses a smooth curve process (for example, a smooth curve formula) to determine the scaling ratio of the integrated target object frame MO in the two image frames and adjust the cropping method for the processed image 330 in the two image frames. Since the smooth curve process can make the changes between the two image frames less drastic, it allows the viewers to have a better and smoother viewing experience. In some embodiments, the presenter can also set the adjustment speed and the adjustment time of the two image frames through the input interface 113 to achieve the desired effect.

As described above, the image processing method and the image processing system in the present disclosure can perform the top-view calibration process on the image and center the target object in the image to achieve the effect of tracking the target object.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processing method, comprising:

receiving, by a processor, an input image from a camera;

performing, by the processor, a top-view calibration process on the input image to generate a top-view calibrated image with a directly-above viewing angle;

performing, by the processor, an object extraction process on the top-view calibrated image to generate a plurality of target object frames containing a plurality of target objects respectively;

integrating, by the processor, the plurality of target object frames to generate an integrated target object frame covering the plurality of target object frames;

performing, by the processer, a centering process on the integrated target object frame to generate a centered image; and outputting, by the processor, the centered image for a display panel to display.

2. The image processing method of claim 1, wherein performing, by the processor, the top-view calibration process comprises:

performing, by the processor, a distortion calibration process on the input image to generate a distortion calibrated image; and performing, by the processor, the top-view calibration process on the distortion calibrated image to generate the top-view calibrated image.

3. The image processing method of claim 1, wherein performing, by the processor, the object extraction process on the top-view calibrated image comprises:

performing, by the processor, a filtering process and a sharpen process on the top-view calibrated image to generate a processed image;

performing, by the processor, a color segmentation process and an edge detection process on the processed image to locate a plurality of object frames; and performing, by the processor, an object detection process on the plurality of object frames to determine the plurality of target object frames from the plurality of object frames.

4. The image processing method of claim 3, wherein performing, by the processor, the object detection process on the plurality of object frames comprises:

performing, by the processor, the object detection process and an object exclusion process on the plurality of object frames to determine the plurality of target object frames from the plurality of object frames.

5. The image processing method of claim 3, wherein the plurality of target objects belong to a target object list.

6. The image processing method of claim 3, wherein performing, by the processor, the centering process on the at least oneintegrated target object frame comprises:

cropping, by the processor, the processed image according to the integrated target object frame to enlarge and center the integrated target object frame so as to generate the centered image.

7. The image processing method of claim 6, wherein the input image is a dynamic image and the image processing method further comprises:

performing, by the processor, a smooth curve process on the integrated target object frame of a first frame in the dynamic image and the integrated target object frame of a second frame in the dynamic image.

8. An image processing system, comprising:

a camera configured to capture an input image;

a memory configured to store a program comprising a plurality of instructions; and a processor configured to execute the instructions to perform following operations:

receiving the input image from the camera;

performing a top-view calibration process on the input image to generate a top-view calibrated image with a directly-above viewing angle;

performing an object extraction process on the top-view calibrated image to generate a plurality of target object frames containing a plurality of target objects respectively;

integrating the plurality of target object frames to generate an integrated target object frame covering the plurality of target object frames;

performing a centering process on the integrated target object frame to generate a centered image; and outputting the centered image for a display panel to display.

9. The image processing system of claim 8, wherein performing the top-view calibration process comprises:

performing a distortion calibration process on the input image to generate a distortion calibrated image; and performing the top-view calibration process on the distortion calibrated image to generate the top-view calibrated image.

10. The image processing system of claim 8, wherein performing the object extraction process on the top-view calibrated image comprises:

performing a filtering process and a sharpen process on the top-view calibrated image to generate a processed image;

performing a color segmentation process and an edge detection process on the processed image to locate a plurality of object frames; and performing an object detection process on the plurality of object frames to determine the plurality of target object frames from the plurality of object frames.

11. The image processing system of claim 10, wherein performing the object detection process on the plurality of object frames comprises:

performing the object detection process and an object exclusion process on the plurality of object frames to determine the plurality of target object frames from the plurality of object frames.

12. The image processing system of claim 10, wherein performing the centering process on the integrated target object frame comprises:

cropping the processed image according to the integrated target object frame to enlarge and center the integrated target object frame so as to generate the centered image.

13. The image processing system of claim 12, wherein the input image is a dynamic image and the processor is further configured to perform:

performing a smooth curve process on the integrated target object frame of a first frame in the dynamic image and the integrated target object frame of a second frame in the dynamic image.

14. The image processing system of claim 12, wherein a center point of an enlarged integrated target object frame is aligned with a center point of the centered image, wherein an aspect ratio of the enlarged integrated target object frame is equal to an aspect ratio of the integrated target object frame.

15. A non-transitory computer readable storage medium storing a program comprising a plurality of instructions, wherein when a processor executes the instructions, the processor performs following operations:

receiving an input image from a camera;

performing a top-view calibration process on the input image to generate a top-view calibrated image with a directly-above viewing angle;

performing an object extraction process on the top-view calibrated image to generate a plurality of target object frames containing a plurality of target objects respectively;

integrating the plurality of target object frames to generate an integrated target object frame covering the plurality of target object frames;

performing a centering process on the integrated target object frame to generate a centered image; and outputting the centered image for a display panel to display.

16. The non-transitory computer readable storage medium of claim 15, wherein performing the top-view calibration process comprises:

performing a distortion calibration process on the input image to generate a distortion calibrated image; and performing the top-view calibration process on the distortion calibrated image to generate the top-view calibrated image.

17. The non-transitory computer readable storage medium of claim 15, wherein performing the object extraction process on the top-view calibrated image comprises:

performing a filtering process and a sharpen process on the top-view calibrated image to generate a processed image;

performing a color segmentation process and an edge detection process on the processed image to locate a plurality of object frames; and performing an object detection process on the plurality of object frames to determine the plurality of target object frames from the plurality of object frames.

18. The non-transitory computer readable storage medium of claim 17, wherein performing the object detection process on the plurality of object frames comprises:

performing the object detection process and an object exclusion process on the plurality of object frames to determine the plurality of target object frames from the plurality of object frames.

19. The non-transitory computer readable storage medium of claim 17, wherein performing the centering process on the integrated target object frame comprises:

cropping the processed image according to the integrated target object frame to enlarge and center the integrated target object frame so as to generate the centered image.

20. The non-transitory computer readable storage medium of claim 19, wherein the input image is a dynamic image and the processor is further configured to perform:

performing a smooth curve process on the integrated target object frame of a first frame in the dynamic image and the integrated target object frame of a second frame in the dynamic image.

* * * * *